(12) United States Patent
Gruenwald et al.

(10) Patent No.: US 9,731,852 B2
(45) Date of Patent: Aug. 15, 2017

(54) WATER BOTTLE WITH DOSAGE IN A BLISTER PACK

(71) Applicants: Eric William Gruenwald, Dallas, TX (US); Patrick Mulligan, Dallas, TX (US); Lawrence Lambelet, Flemington, NJ (US)

(72) Inventors: Eric William Gruenwald, Dallas, TX (US); Patrick Mulligan, Dallas, TX (US); Lawrence Lambelet, Flemington, NJ (US)

(*) Notice: Subject to any disclaimer, the term of this patent is extended or adjusted under 35 U.S.C. 154(b) by 0 days.

(21) Appl. No.: 14/672,189

(22) Filed: Mar. 29, 2015

(65) Prior Publication Data

US 2015/0203262 A1  Jul. 23, 2015

Related U.S. Application Data

(63) Continuation-in-part of application No. 12/355,773, filed on Jan. 17, 2009, now abandoned.

(51) Int. Cl.
*B65D 83/04* (2006.01)
*B65B 55/00* (2006.01)
(Continued)

(52) U.S. Cl.
CPC ............... *B65B 55/00* (2013.01); *A23L 2/52* (2013.01); *B65C 3/18* (2013.01); *B65C 3/24* (2013.01);
(Continued)

(58) Field of Classification Search
CPC ............ B65D 51/2821; B65D 43/0235; B65D 1/0246; B65D 75/36; B65D 2575/362; B65D 83/04; B65D 2101/00; B65D 11/04; B65D 17/02; B65D 17/502; B65D 23/0878; B65D 23/12; B65D 41/62; B65D 41/3461–41/3476; B65D 55/024; B65D 71/08; B65D 81/3205–81/3211;
(Continued)

(56) References Cited

U.S. PATENT DOCUMENTS 2,029,131 A   1/1936 Shoemaker
2,250,666 A * 7/1941 Godefroy ............... B65D 23/12
                                         206/219

(Continued)

FOREIGN PATENT DOCUMENTS

JP   2003341677 A   12/2002
JP   2004-203484     7/2004
(Continued)

*Primary Examiner* — Drew Becker
(74) *Attorney, Agent, or Firm* — Lawrence Lambelet Jr.; Lyman Smith

(57) ABSTRACT

A solid dosage preparation is provided with a bottle of water. The solid dosage preparation is contained in a safe and sanitary blister package and attached by means of a shrink band to the closure of the bottle. The shrink band provides a tamper-indicating seal for the both the bottle and blister contents. An advantage of the design is that it does not require customization of bottle and closure tooling, and thereby provides a simple and cost-effective means for combining solid and liquid materials in a unitary package. An additional advantage is the robustness of the tamper-indicating system and methodology.

8 Claims, 2 Drawing Sheets

(51) Int. Cl.

| | | |
|---|---|---|
| *A23L 2/52* | (2006.01) | |
| *B65D 55/02* | (2006.01) | |
| *B65C 3/18* | (2006.01) | |
| *B65D 71/08* | (2006.01) | |
| *B65D 17/50* | (2006.01) | |
| *B65D 17/00* | (2006.01) | |
| *B65D 23/08* | (2006.01) | |
| *B65D 41/34* | (2006.01) | |
| *B65D 23/12* | (2006.01) | |
| *B65C 3/24* | (2006.01) | |
| *B65D 41/62* | (2006.01) | |
| *B65D 8/00* | (2006.01) | |
| *B65D 51/28* | (2006.01) | |
| *B65D 81/32* | (2006.01) | |

(52) U.S. Cl.
CPC ............ *B65D 11/04* (2013.01); *B65D 17/02* (2013.01); *B65D 17/502* (2013.01); *B65D 23/0878* (2013.01); *B65D 23/12* (2013.01); *B65D 41/3476* (2013.01); *B65D 41/62* (2013.01); *B65D 51/2821* (2013.01); *B65D 55/024* (2013.01); *B65D 71/08* (2013.01); *B65D 81/3205* (2013.01); *B65D 83/04* (2013.01); *A23V 2002/00* (2013.01)

(58) Field of Classification Search
CPC ....... B65B 55/00; A23L 2/52; A23V 2002/00; B65C 3/18–3/24
USPC ......... 426/112, 115, 119, 120, 394; 206/219, 206/217, 222, 229, 531, 530, 532, 538, 206/640, 497, 828; 215/246, 901
See application file for complete search history.

(56) References Cited

U.S. PATENT DOCUMENTS

| | | | | |
|---|---|---|---|---|
| 2,328,845 A | * | 9/1943 | Pike | B29C 61/10 156/194 |
| 2,886,171 A | | 5/1959 | Bandfield | |
| 3,112,824 A | * | 12/1963 | Lemelson | B65B 11/52 206/216 |
| 3,746,158 A | * | 7/1973 | Connick | B65D 51/20 206/568 |
| 3,768,688 A | * | 10/1973 | Linke | B65D 51/28 215/227 |
| 4,432,455 A | * | 2/1984 | Savoir | B65D 75/327 206/303 |
| 4,592,475 A | * | 6/1986 | Hannon | B29C 33/485 215/252 |
| 5,370,222 A | * | 12/1994 | Steigerwald | B65D 81/3205 206/219 |
| 6,170,654 B1 | | 1/2001 | Gartner | |
| 6,386,358 B1 | | 5/2002 | North | |
| 6,488,146 B1 | | 12/2002 | Dotsikas | |
| 6,959,841 B2 | | 11/2005 | Vlodek | |
| 7,163,129 B1 | * | 1/2007 | Bennett | B65D 17/165 206/222 |
| 8,141,727 B2 | * | 3/2012 | Gruenwald | B65D 23/12 215/201 |
| 8,479,936 B2 | * | 7/2013 | Gruenwald | B65D 51/18 215/253 |
| 8,757,408 B2 | * | 6/2014 | Joubert | B65D 23/085 215/227 |
| 2002/0195413 A1 | * | 12/2002 | Eastman | B65D 55/026 215/230 |
| 2003/0000910 A1 | * | 1/2003 | Jang | B65D 51/18 215/227 |
| 2003/0178337 A1 | * | 9/2003 | Friedman | A47G 19/2205 206/497 |
| 2004/0011679 A1 | | 1/2004 | Vlodek | |
| 2005/0035081 A1 | * | 2/2005 | Fitch | B65D 55/0854 215/246 |
| 2005/0040052 A1 | * | 2/2005 | Dixon | B65D 51/28 206/217 |
| 2007/0090000 A1 | * | 4/2007 | Hjalmarsson | B65D 51/225 206/219 |
| 2007/0158232 A1 | * | 7/2007 | Spector | A61J 1/035 206/531 |
| 2007/0221602 A1 | * | 9/2007 | Dib | B65D 11/04 215/6 |
| 2008/0000786 A1 | | 1/2008 | Collotta | |
| 2008/0202951 A1 | | 8/2008 | Landolt | |
| 2010/0181275 A1 | | 7/2010 | Gruenwald | |
| 2010/0181279 A1 | | 7/2010 | Gruenwald | |
| 2010/0230375 A1 | | 9/2010 | Gruenwald | |
| 2014/0360966 A1 | * | 12/2014 | Howard | B65D 1/04 215/6 |

FOREIGN PATENT DOCUMENTS

| | | |
|---|---|---|
| WO | 2007017911 A1 | 2/2007 |
| WO | 2007063863 A | 6/2007 |
| WO | 2010082947 A2 | 7/2010 |

* cited by examiner

WATER BOTTLE WITH DOSAGE IN A BLISTER PACK

CROSS-REFERENCE TO RELATED APPLICATIONS

This is a Continuation-In-Part application claiming priority to U.S. Non-Provisional application Ser. No. 12/355,773, filed Jan. 17, 2009, now abandoned.

FIELD OF THE INVENTION

This invention relates to bottled water products, and more particularly to a nutritionally enhanced drink.

BACKGROUND OF THE INVENTION

Additives are commonly sold in combination with bottled water. Currently marketed examples include energy, or health, drinks, where the additive is provided in solution form. Other examples include a medication where the bottled water is supplied simply as a convenience for washing down a pill or a capsule.

In particular instances involving nutritional supplements, however, it is useful to supply the supplement in solid dosage form, similar to the medication example. Doing so improves the shelf stability of a natural active ingredient, and particularly one of a biological derivation, which might otherwise degrade or lose potency over time when in dissolution.

In contrast with the medication circumstance, however, the water is not just a convenience for administering the dosage. It is also a measured amount of ingredient required for the best metabolic results. Therefore, the means for combining the two components into a single package is an important aspect of the product put-up.

The bottle closure typically provides such means in the prior art. For example, in U.S. Patent Application 2003/0000910 to Jang, a cap to a water bottle contains a compartment for the dosage. The compartment is closed with a separate cap, which may be attached by a hinge. In another example, U.S. Patent Application 2008/0000786 to Collotta, the tablet or capsule is housed in a space between a cap and a secondary cap, or over cap. In this version, the over cap is snapped over a standard bottle closure and held in place by a tamper-evident seal. The tamper-evident seal, which conforms to the smooth bottle profile, lacks an undercut feature to wrap around and prevent compromise by slipping it off and on. In both of these examples, the pills or capsules are loose in the cavity spaces and are without the protection of any individual packaging designed for sanitary and safe handling.

In U.S. Pat. No. 6,959,841 to Vlodek, a push-through blister package is housed within an assembly of cap components. The blister is comprised of a thermoformed "pocket" heat sealed to a frangible lidding, typically aluminum foil. The solid dose is contained in the pocket and can be expelled there from by pushing through the lidding. Blister packaging, commonly used for pharmaceutical packaging and usually sited where the dosage is prepared, can provide a sanitary, if not aseptic, means for handling, and a safe means for transporting, the product.

Each of the prior art examples, however, involve an assembly of separate cap components requiring multiple custom tools. For cost reasons, it would be preferable to have a means for utilizing a stock cap and thereby avoiding specialized tooling. What is missing in the prior art is a way to combine a blister package containing an individual dose with a stock cap for a water bottle in a simple and cost-effective construction, which is, at the same time, essentially nonviolable with respect to tamper-evidence.

SUMMARY OF THE INVENTION

In view of the above-mentioned unfulfilled needs, the present invention embodies, but is not limited by, the following objects and advantages:

A first objective of the present invention is to provide a solid dosage form of a solid dosage preparation together with a bottle of water.

A second objective of the present invention is to provide the solid dosage preparation in a sanitary and safe blister package.

A third objective of the present invention is to utilize a stock, or commodity, closure for the bottle.

A fourth objective of the present invention is to render both the water and the solid dosage preparation secure from tampering in a manner that is essentially nonviolable.

In a preferred embodiment of the present invention, an enhanced water product combined with a safety feature comprises a water bottle containing water and having a neck finish and a neck flange operable with a closure. The closure is sealing fitted to the neck finish and has a top surface thereon. The enhanced water product further comprises a solid dosage preparation contained in a means for disposing said preparation on the top surface of the closure. The means for disposing protects the solid dosage preparation from contamination when separate from the closure. Additionally, the enhanced water product comprises a means for attaching the means for disposing to the top surface of the closure. The means for attaching also provides an indication of tampering, which is essentially violable, in the event of a violation attempt.

In a particularly preferred embodiment of the present invention, the means for disposing comprises a blister package. The blister package is comprised of a film and a frangible lidding sealed thereto to form a laminated structure, the film having a cavity formed therein. The laminated structure has a blister flange surrounding the cavity which substantially covers the top surface of the closure.

In a particularly preferred embodiment of the present invention, the means for attaching comprises a shrink band jacketing the cap and blister package in a heat-applied conformation sealingly overlapping both the blister flange and the neck flange. In this manner, the blister package is secured to the closure and the closure to the water bottle, and access to either the solid dosage preparation through the lidding, or the water through the closure, cannot occur without the shrink band evidencing tampering.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein.

DETAILED DESCRIPTION OF THE PREFERRED EMBODIMENT

Figures 1, 4, 5:
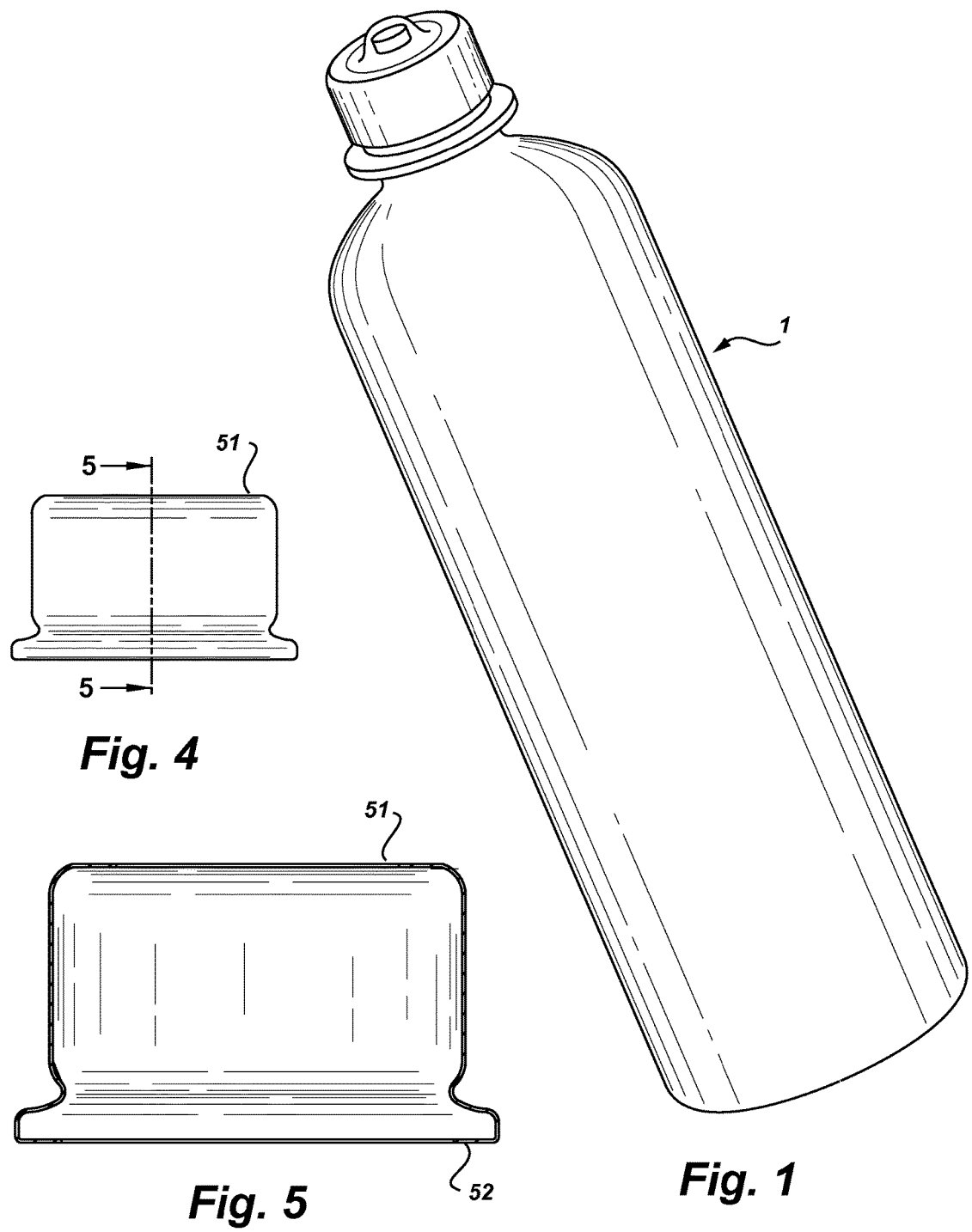
FIG. 1 is a perspective view of the invention, illustrating a bottled water product with a solid dosage preparation.
FIG. 4 is a front elevation view of the shrink band.
FIG. 5 is an enlarged section view of FIG. 4 taken along the lines 5-5.
Figure 2:
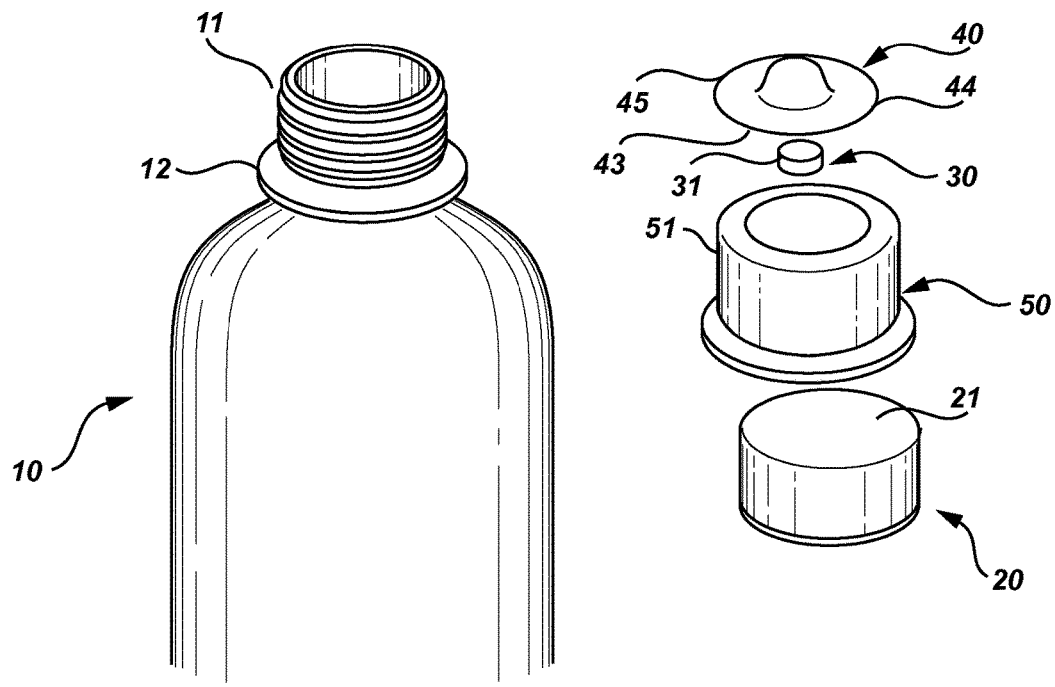
FIG. 2 is a partial exploded view in perspective.
Figure 3:
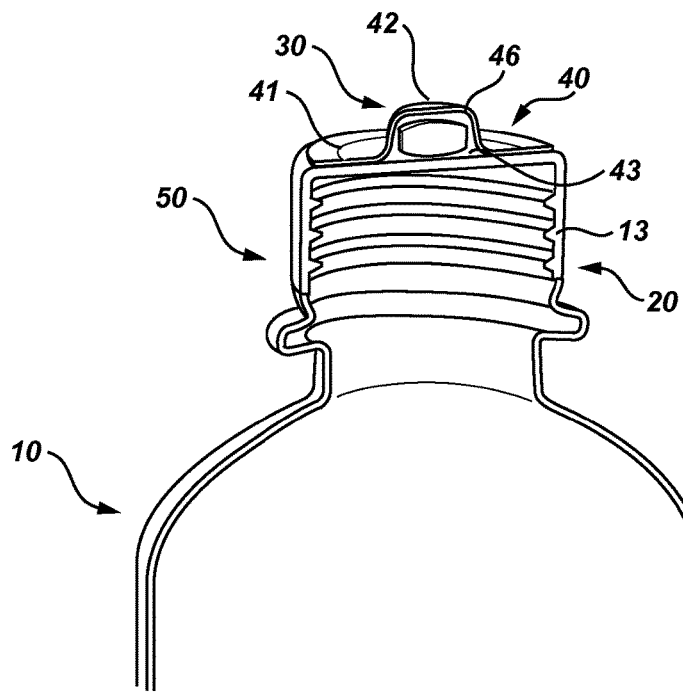
FIG. 3 is a partial section view in perspective.

FIG. 1 shows an enhanced water product 1. The major components thereof are best shown in FIGS. 2 and 3. Water bottle 10 is sealed by closure 20. solid dosage preparation 30 is contained within a means for deploying 40. Means for deploying 40 is joined with closure 20 and bottle 10 by a means for attaching 50.

Referring to FIG. 2, water bottle 10 is provided with a neck finish 11 and a neck flange 12. Closure 20 is sealingly fitted to neck finish 11 by means of screw threads 13, best shown in FIG. 3. Closure 20 has a top surface 21.

In the preferred embodiment, the means for deploying 40 is a blister package 41. Referring to FIG. 3, blister package 41 is comprised of a film 42, which is heat-sealed to a frangible lidding 43 to form a laminated structure 44 (FIG. 2). Film 42 can be heated and drawn by a plug die to form a cavity 46. Blister package 41 has an extended sealing area forming a blister flange 45 (FIG. 2). The extent of blister flange 45 is such that it substantially covers top surface 21.

The solid dosage preparation 30 is represented in the drawings by tablet 31. The term "solid dosage preparation" may comprehend a plurality of tablets, and, in the alternative, caplets or capsules. Tablet 31 is placed in cavity 46 of blister package 41 prior to the lamination step. If the packaging of the tablet in the blister package is a coincidental process with the production of the tablet, the blister package becomes a sanitary and safe means of conveying and deploying the tablet, particularly if the process is carried out in a clean-room environment.

In the preferred embodiment, the means for attaching 50 is shrink band 51, shown in FIGS. 2, 4 and 5. Shrink band 51 is applied as a tube slipped over closure 20 with blister package 41 reposing on top surface 21, the tube extending above blister flange 45 on one end and below neck flange 12 on the other end. When heat is applied to shrink band 51, the shrinkable material radially contracts and wraps itself around neck flange 12, forming an undercut underlap 52, while engaging blister flange 45 in an overlap. The shrink band is illustrated in the figures as having been shrunken. Because of the stiffness of blister flange 45, the undercut underlap 52 will firmly attach blister package 41 to closure 20 and prevent removal of the shrink band 51 by any non-destructive means. Since frangible lidding 43 is protected against top surface 21, and blister package 41 cannot be removed from top surface 21 without evidence of damage to shrink band 51, a tamper-indicating system for tablet 31 is therein defined. Similarly, since closure 20 cannot be removed from neck finish 11 while encapsulated by shrink band 51 without evidencing damage thereto, the contents of water bottle 20 is rendered protected by notice of a tampering incident.

While recognizing that nothing is one-hundred percent tamper-safe, it is possible to postulate a situation where measures to conceal tampering would be so extreme as to be considered unpractical. The tamper-evident system discussed in the paragraph above is such a situation. To violate the tablet 31, for example, the blister package 41 would have to be essentially reconstructed. This would involve access to specialized tooling and equipment. To violate the water and gain access to the blister package 41 from underneath, where temporary concealment of a broach might be possible, the shrink band 51 would have to be replaced because, in view of the fact that heat-shrinking involves irreversible molecular chain realignments, removal would involve destroying it. Replacing the shrink band would involve matching the material and access, again, to specialized equipment. The shrink material, having a preferred size and shrink modulus, could be rendered further unique by pattern-printing with a brand name, or a term such as "safety-sealed", for example. With these means and methods, therefore, the safety of the ingredients in the instant package can be considered essentially nonviolable in a tamper-indicating sense.

Water bottle 10 can be formed by known methods in a variety of thermoplastic materials. In the preferred embodiment, the bottle is blow-molded from polyethylene terephthalate (PETE), which is a clear resin of the polyester family. Similarly, production methods and materials for the closure are in common practice. In the preferred embodiment, closure 20 is injection molded from one, or a combination of, polypropylene (PP) or polyethylene (PE), both of which are commodity resins generically known as polyolefin's. It is preferred that both the bottle and the closure come from stock-supply scenarios, where high-volume tooling in continuous production keeps costs to a minimum. It is an advantage of the present invention to allow use of such non-specialized components for packaging water.

Blister package 41 is produced by a thermoforming process. The process involves web-fed film and foil, wherein the film is heated and drawn between male and female dies to form a cavity, the cavity is filled with contents, the foil is subsequently heat-seated to the cavity selvage, and the blister is die cut from the laminated web. In pharmaceutical operations, this is commonly done in a clean room adjacent the solid dosage preparation area. In the preferred embodiment, the film is plasticized polyvinyl chloride (PVC), and the foil is a frangible aluminum foil.

Tablet 31 is compressed and shaped in a die following a granulation process where the ingredients are blended and dried. Tablet processing is well known in the solid dosage art. Shrink band 51 is supplied in an extruded tube cut to a length sufficient to rest on the shoulder of the bottle and extend over the top of the closure. The sleeved bottle is then sent through a heat tunnel where radiant heat shrinks the band into profile conformance. In the preferred embodiment, the shrink band is comprised of clear PVC material. It may also have a vertical perforation to assist in its removal.

While a particular form of the invention has been illustrated and described, it will be apparent that various modifications can be made without departing from the spirit and scope of the invention. For example, instead of threading, the closure may snap over a lip on the neck finish; or the shrink band may extend to cover the entire body of the bottle; or the blister package may have multiple cavities with multiple doses therein. Accordingly, it is not intended that the invention be limited, except as by the appended claims.

What is claimed is:

1. An enhanced water product with safety feature, comprising:
    a water bottle containing water and having a neck circumscribed by a neck finish and a neck flange operable with a closure, said neck flange extending radially outward from said neck;
    a closure cap sealingly fitted to the neck finish having a top surface, the top surface defining an exterior plane of the water bottle and closure cap combination;
    a solid dosage preparation;

a blister package having a cavity formed therein to contain and encompass the solid dosage preparation, the blister package including a blister flange formed integrally with the blister package and surrounding the cavity, the blister flange substantially extending toward an outer periphery of the top surface of the closure cap; and a means for attaching the blister package to the top surface, the means for attaching further providing, in combination with the blister package, an essentially nonviolable indication of tampering should tampering be attempted, wherein the cavity of the blister package protrudes from the top surface of the closure cap and forms a portion of an exterior of the enhanced water product without the means for attaching the blister package to the top surface disposed thereover, and wherein the blister package can be removed from the closure cap with the solid dosage preparation encased in the cavity thereof when the means for attaching is removed.

2. The enhanced water product of claim 1, wherein the means for attaching is a shrink band jacketing the cap and the blister package in a heat-applied conformation sealingly overlapping both the blister flange and the neck flange, whereby the blister package is secured to the cap and the cap to the water bottle, and whereby access to either the solid dosage preparation through the lidding, or the water through the closure, cannot occur without the shrink band evidencing tampering.

3. The enhanced water product of claim 1, wherein the blister package further comprises a transparent film, such that the solid dosage preparation is rendered visible.

4. The enhanced water product of claim 1, wherein the solid dosage preparation is at least one of a tablet, a caplet, or a capsule.

5. An enhanced water product with safety feature, comprising:
   a water bottle containing water and having a neck circumscribed by a neck finish and a neck flange operable with a closure, said neck flange extending radially outward from said neck;
   a closure cap sealingly fitted to the neck finish having a top surface;
   a blister package comprised of a film and a frangible lidding sealed thereto to form a laminated structure, the film having a cavity formed therein, the laminated structure having a blister flange surrounding the cavity, the blister package disposed on the top surface of the cap with the blister flange substantially extending toward an outer periphery of the top surface, the blister package sealingly protecting the contents in the cavity from contamination when separated from the closure;
   a solid dosage preparation contained within the lidded cavity of the blister package; and
   a shrink band jacketing the cap and blister package in a heat-applied conformation sealingly overlapping both the blister flange and the neck flange, the shrink band having a hole formed therein, therein the cavity of the blister package protrudes from the hole when the shrink band is applied to jacket the cap and the blister package, whereby the blister package is secured to the cap and the cap to the water bottle, and whereby access to either the solid dosage preparation through the lidding, or the water through the closure, cannot occur without the shrink band evidencing tampering;
   whereby, the combination of the blister package and the shrink band provide a nonviolable indication of tampering to the solid dosage preparation, and wherein
   the blister package can be removed from the closure cap with the solid dosage preparation encased in the cavity thereof when the means for attaching is removed.

6. The enhanced water product of claim 5, wherein the blister package further comprises a transparent film, such that the solid dosage preparation is rendered visible.

7. The enhanced water product of claim 5, wherein the solid dosage preparation is at least one of a tablet, a caplet, or a capsule.

8. A method of rendering an enhanced water product safe from tampering, comprising the steps of:
   providing a blister package comprised of a film and a frangible lidding sealed thereto to form a laminated structure, the film having a cavity formed therein, the laminated structure having a blister flange surrounding the cavity, the blister package disposed on the top surface of a cap on a bottle of water with the blister flange substantially extending toward an outer periphery of the top surface, the blister package sealingly protecting contents therein from contamination when separated from the closure; and a solid dosage preparation contained within the lidded cavity of the blister package; and
   heat-sealing a pattern-printed shrink band to jacketing the cap and blister package in a heat-applied conformation sealingly overlapping both the blister flange and the neck flange, the shrink band having a hole formed therein, wherein the cavity of the blister package protrudes from the hole when the shrink band is applied to jacket the cap and the blister package, and wherein the blister package can be removed from the closure cap with the solid dosage preparation encased in the cavity thereof when the means for attaching is removed;
   whereby the blister package is secured to the cap and the cap to the water bottle, and
   whereby access to either the solid dosage preparation through the lidding, or the water through the closure, cannot occur without the shrink band evidencing tampering.

* * * * *